Aug. 8, 1950     A. G. NICKLE     2,517,913
GEAR CASE ASSEMBLY
Filed April 27, 1945

INVENTOR.
Arthur G. Nickle
BY Frank C. Fearman
ATTORNEY.

Patented Aug. 8, 1950

2,517,913

UNITED STATES PATENT OFFICE 2,517,913

GEAR CASE ASSEMBLY

Arthur G. Nickle, Saginaw, Mich.

Application April 27, 1945, Serial No. 590,683

6 Claims. (Cl. 74—467)

This invention relates to a gear-case assembly for machines that employ a plurality of horizontal shafts that are made coacting by means of intermeshing gears, such means being enclosed in a housing that is adapted to retain lubricating oil. The objects and advantages of the invention will be apparent from the following detailed description made with reference to the accompanying drawing.

Figure 1:
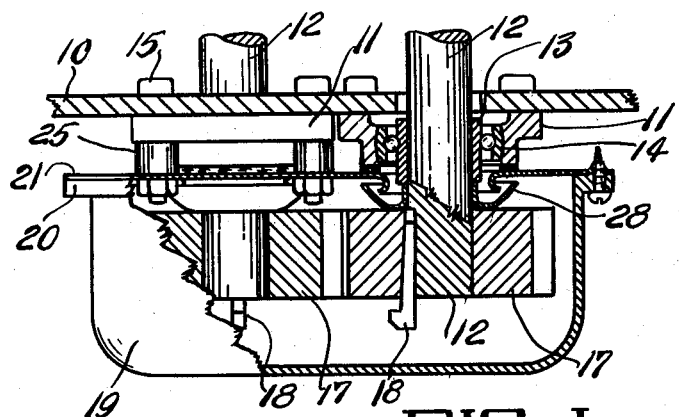
Fig. 1 is a top plan view with parts broken away and with other parts in cross-section showing a gear-case assembly in which my invention is embodied.

Referring to the drawing:

The numeral 10 indicates the vertical wall of a processing chamber or the frame of a machine structure that supports a plurality of flanged bearing structures 11 in which the shafts 12 are journaled. The bearing structures have inner and outer ball races 13 and 14 respectively, and each bearing structure is secured independently to the machine structure by a plurality of bolts 15, the threaded ends 16 of the bolts being preferably pointed outward with respect to the machine structure. The shafts are made coacting by intermeshing gears 17 secured thereto by gib-head taper machine keys 18.

The gears 17 are surrounded by a housing that comprises a dish-shaped cover 19 formed with a flange 20 that seats against the vertical back plate 21 to form an oil-tight joint that permits the lower portion of the casing to be used as a reservoir for the lubricating oil 22 into which the gear teeth dip as the gears are driven. The back plate 21 is apertured as at 23 to assemble over the threaded ends 16 of bearing bolts 15, it being secured thereto in oil-tight relation by nuts 24 which tension the bolts. The back plate is held in spaced relation from the bearing structure 11 by tubular separators 25 or the equivalent which surround the bearing bolts and are preferably in threaded engagement therewith.

Seated in the space between the back plate 21 and the adjacent end of each bearing structure is a ring gasket 26 made of compressible material and adapted to exclude dust and dirt from the bearing races.

Each shaft projects outwardly through an opening 27 in the back plate without frictional contact. The means employed to prevent escape of oil through the shaft opening 27 comprises the dish-shaped rotary flinger 28 associated with the annular gutter 29 that surrounds the shaft opening on the inside of the back plate. The gutter 29 is preferably die formed integral with the back plate, the marginal edge 30 being flared so that oil splashed against the back plate by the rotating parts within the casing will drain downward by gravity without any tendency to escape through the shaft opening.

The oil flinger 28 is mounted on the shaft adjacent to the back plate, and is driven by frictional contact with the shaft, the hub 31 being extended to seat against the adjacent end of the inner bearing race 13, thereby spacing the marginal edge 32 of the flinger a predetermined distance from the back plate. The flinger is made dish shaped so as to overlap the marginal edge 30 of the gutter with sufficient clearance at 33 to permit oil collecting on the inside 34 of the flinger to be centrifugally discharged in an angular direction towards the back plate. In like manner, oil collecting on the outside of the flinger is also flung angularly towards the back plate, or the oil from both sides of the flinger may be discharged simultaneously towards the back plate. However, under no circumstances can the oil leaving the flinger escape through the shaft opening in the back plate.

Figure 4:
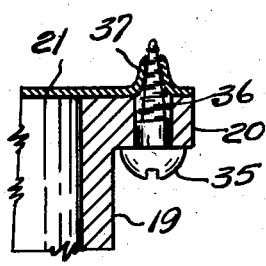
Fig. 4 is a fragmentary enlarged sectional view showing how the flanged gear-case cover is secured to the back wall thereof.
Figure 2:
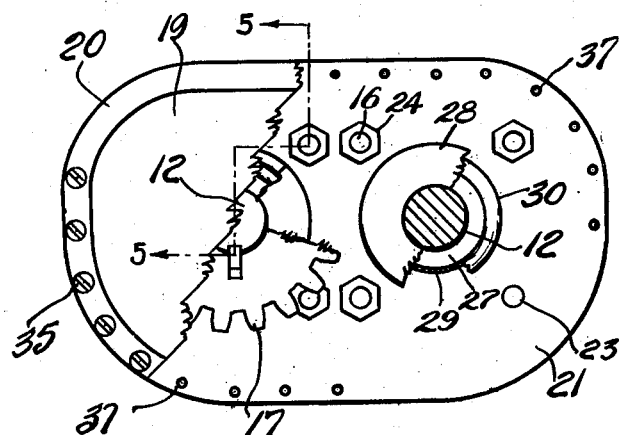
Fig. 2 is a front-elevational view of the gear-case assembly with parts broken away.
Figure 5:
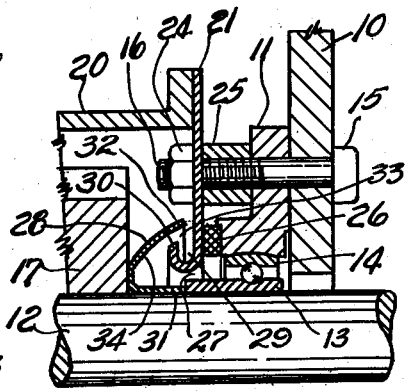
Fig. 5 is a enlarged fragmentary sectional view taken approximately on line 5—5 of Fig. 2.

As shown in Fig. 4 of the drawing, the flanged gear-case cover 19 is held in oil-tight relation with the back plate by means of a plurality of thread-forming screws 35 that pass through the flange holes 36 and engage tapered perforations 37 in the back plate, these perforations being shaped to receive the pointed end of the screw that forms or cuts the threads in the back plate when the screws are turned to draw the back plate against the cover flange. This method of making an oil-tight joint not only saves the cost of pre-threading a large number of holes in the back plate, but it permits the use of relatively thin metal for the back plate, which metal is readily die formed to produce the gutter around the shaft openings as above set forth.

Figure 3:
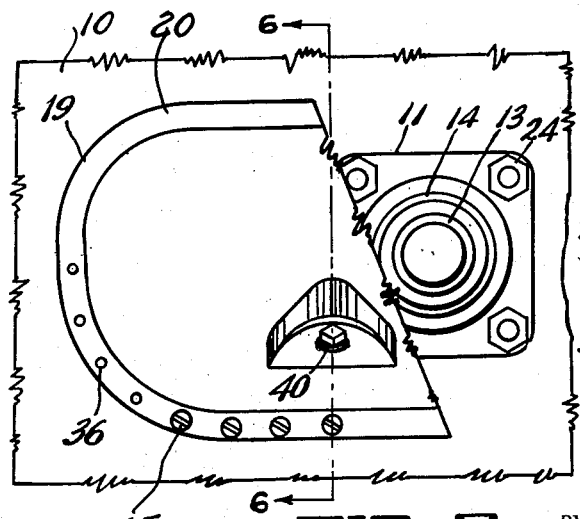
Fig. 3 is a front elevational view similar to Fig. 2 having parts broken away to expose one of the shaft bearings.
Figure 6:
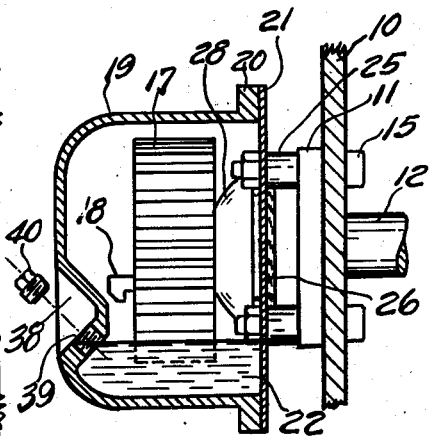
Fig. 6 is a cross-sectional elevational view taken approximately on line 6—6 of Fig. 3, and showing a threaded plug disassembled from the gear-case.

The gear-case cover 19 is made of cast iron and formed with a recess as shown in Figs. 3 and 6, the recess 38 having a threaded opening 39 that is closed by the plug 40 which is removed when oil is introduced into the casing. This opening also serves as an overflow that prevents the introduction of an excess of oil into the casing. For this reason the opening is located at a predetermined elevation that prevents the oil flinger from dipping into the reservoir of oil. Otherwise, the object of the oil flinger would be defeated.

What I claim is:

1. In the combination that includes a machine having a plurality of horizontal shafts made coacting by intermeshing gears, a flanged bearing in which each shaft is journaled, means for securing the bearing flange to the machine structure, said means being a plurality of threaded bolts in apertured engagement therewith, a housing surrounding the gears in spaced relation with the machine structure, an opening in the back wall of the housing through which each shaft projects in non-frictional relation, and means for supporting the housing in said relation to the machine structure and shafts, said means being the threaded bolts in apertured engagement with back wall of said housing.

2. In the combination that includes a machine having a plurality of horizontal shafts made coacting by intermeshing gears, a flanged bearing structure in which each shaft is journaled, a two-piece housing surrounding the gears and adapted to contain a limited volume of oil into which the gear teeth dip when the shafts rotate, said housing comprising a dish-shaped cover that is removably attached to a back wall plate in oil-tight relation, an opening in the back wall plate through which each shaft projects in non-oil-tight relation, means for preventing the escape of oil through the shaft opening in the back wall plate, common means for securing the back wall plate and the flanged bearing structure to the machine structure, said means being a plurality of threaded bolts in apertured engagement with the bearing flanges and the back wall plate, and means for securing the dished cover to the back wall plate, said means being a plurality of self-threading screws in apertured engagement therewith.

3. In the combination that includes a machine having a plurality of horizontal shafts made coacting by intermeshing gears, a flanged bearing structure in which each shaft is journaled, means in apertured engagement with each bearing flange for securing it to the machine structure, said means being a plurality of bolts having threaded ends that project beyond the outer face of the bearing flange, a housing surrounding the gears and adapted to contain a limited volume of oil into which the gear teeth dip when the shafts rotate, an opening in the back wall of the housing through which each shaft projects in non-liquid-tight relation, means for supporting the back wall of the housing in spaced relation from the bearing structure, said means including the projecting ends of the bearing flange bolts in apertured engagement with the said back wall, and closure means for the space between the back wall and the end of the bearing, said means being a ring gasket of compressible material.

4. In a machine including a plurality of horizontal shafts made coacting by intermeshing gears mounted thereon, a flanged bearing in which each shaft is journaled, means for detachably securing the bearing flanges to the machine structure, a housing surrounding the gears and having a back wall which is axially spaced therefrom, means for detachably securing the back wall of the housing to the bearing flanges and in spaced relation therefrom, an opening in the back wall through which each shaft projects to engage the bearing in which it is journaled, the shaft and all elements mounted thereon within the confines of the housing being rotatable without contact with a stationary element, a reservoir of oil in the housing into which the teeth on the several gears dip when the shafts rotate, means for limiting the maximum height of the oil level to an elevation that is lower than the shaft openings in the back wall, an oil-receiving gutter formed on the inside of the back wall and surrounding each shaft opening, said gutter being adapted to return oil by gravity to the reservoir when such oil is splashed upon the back wall by the rotating elements within the housing, and means cooperating with the gutter and in overlapping, non-frictional relation therewith for preventing escape of oil through the shaft opening, said means being a dished oil flinger mounted on the shaft between the gear and the back wall for rotation without dipping below the level of the oil in the reservoir.

5. In a machine including a plurality of horizontal shafts made coacting by intermeshing gears mounted thereon, a flanged bearing in which each shaft is journaled, means for detachably securing the bearing flanges to the machine structure, a housing surrounding the gears and having a back wall which is axially spaced therefrom, means for detachably securing the back wall to the bearing flanges in spaced relation therefrom, an opening in the back wall through which each shaft projects to engage the bearing in which it is journaled, the shaft and all elements mounted thereon within the confines of the housing being rotatable without contact with a stationary element, a reservoir in the housing which contains oil into which the teeth on the several gears dip when the shafts rotate, means for limiting the maximum elevation of the oil level, a dished flinger disk mounted on each shaft for rotation between the gear and the back wall, said disk being adapted to centrifugally fling oil collecting thereon or therein angularly towards the back wall, and stationary means supported by the back wall for preventing the oil flung against the back wall from escaping through the opening in said wall, the said means being an oil-receiving gutter surrounding the shaft and adapted to return oil to the reservoir which oil would otherwise escape through the shaft opening.

6. The combination as cited in claim 5 wherein the means for limiting the maximum elevation of the oil level in the reservoir is an oil inlet in the housing, the said inlet being positioned at an elevation which will cause it to overflow before the oil level reaches the lowermost part of the oil flinger.

ARTHUR G. NICKLE.

REFERENCES CITED

The following references are of record in the file of this patent:

UNITED STATES PATENTS

| Number | Name | Date |
|---|---|---|
| 672,951 | Merrick | Apr. 30, 1901 |
| 815,045 | Schmidt | Mar. 13, 1906 |
| 1,014,628 | Lieber | Jan. 9, 1912 |
| 1,248,493 | Holy | Dec. 4, 1917 |
| 1,522,068 | Morgan | Jan. 6, 1925 |
| 1,601,115 | Fuller | Sept. 28, 1926 |
| 1,789,116 | Shaw et al. | Jan. 13, 1931 |
| 1,902,050 | Vincent | Mar. 21, 1933 |
| 2,079,730 | Blair | May 11, 1937 |
| 2,173,339 | Myers | Sept. 19, 1939 |

FOREIGN PATENTS

| Number | Country | Date |
|---|---|---|
| 102,147 | Great Britain | Oct. 4, 1917 |
| 221,044 | Great Britain | Sept. 4, 1924 |